United States Patent [19]

Cailor et al.

[11] Patent Number: 5,524,972
[45] Date of Patent: Jun. 11, 1996

[54] PROTECTIVE WHEEL MASK

[76] Inventors: Bradley S. Cailor, 8400 Oak Village Blvd., Lewis Center, Ohio 43035; Pat J. Hentosh, 1206 Weybridge Rd., Columbus, Ohio 43220

[21] Appl. No.: 482,438

[22] Filed: Jun. 7, 1995

[51] Int. Cl.⁶ .................................................. B60B 7/06
[52] U.S. Cl. ..................... 301/37.42; 301/37.1; 118/505
[58] Field of Search ............................... 301/37.1, 37.42; 118/504, 505

[56] References Cited

U.S. PATENT DOCUMENTS

| | | | |
|---|---|---|---|
| 2,627,839 | 2/1953 | Hudgins et al. | 118/505 |
| 3,854,448 | 12/1974 | Kromanaker | 301/37.1 X |
| 4,628,858 | 12/1986 | King et al. | 118/504 |
| 4,784,440 | 11/1988 | Fair | 301/37.1 |
| 4,787,331 | 11/1988 | Jarvis | 118/504 |
| 4,792,191 | 12/1988 | Farmer | 301/37.1 |
| 4,811,991 | 3/1989 | Moreno | 301/37.1 |
| 4,874,206 | 10/1989 | Sampson | 301/37.1 |
| 4,955,670 | 9/1990 | Koller | 301/37.1 |

FOREIGN PATENT DOCUMENTS 851780  10/1952  Germany ................... 301/37.1

*Primary Examiner*—Russell D. Stormer
*Attorney, Agent, or Firm*—David A. Greenlee

[57] ABSTRACT

A wheel mask provided to protect the vehicle wheels during chemical treatment of the tires is a unitary thin plastic molding having a circular concave body that includes a central hub having an exterior handle and terminates in a flared outer periphery. The flared outer periphery includes a plurality of radially-spaced annular raised ridges, each having tapered annular inner and outer walls connected by an annular crown. Each ridge corresponds to a specific size wheel rim. A plurality of annular depressed grooves are formed at the juncture of adjacent inner and outer walls. The handle is inwardly open and formed of walls which project outwardly of the hub and are tapered to permit partial insertion of a handle of another mask, and the ridge walls are angled outwardly to enhance stacking of a plurality of masks. A plurality of spaced slits are provided in each groove to form weakened groove cut lines to facilitate trimming the mask to a specific size wheel and enable the outermost ridge to embrace the outer annular edge of a specific size wheel rim. One or more integral depressions having restricted resilient openings can be provided to retain bottles of tire treatment. Also, the central hub can be provided with projections comprising feet to support in inverted wheel mask for use a liquid vessel.

19 Claims, 5 Drawing Sheets

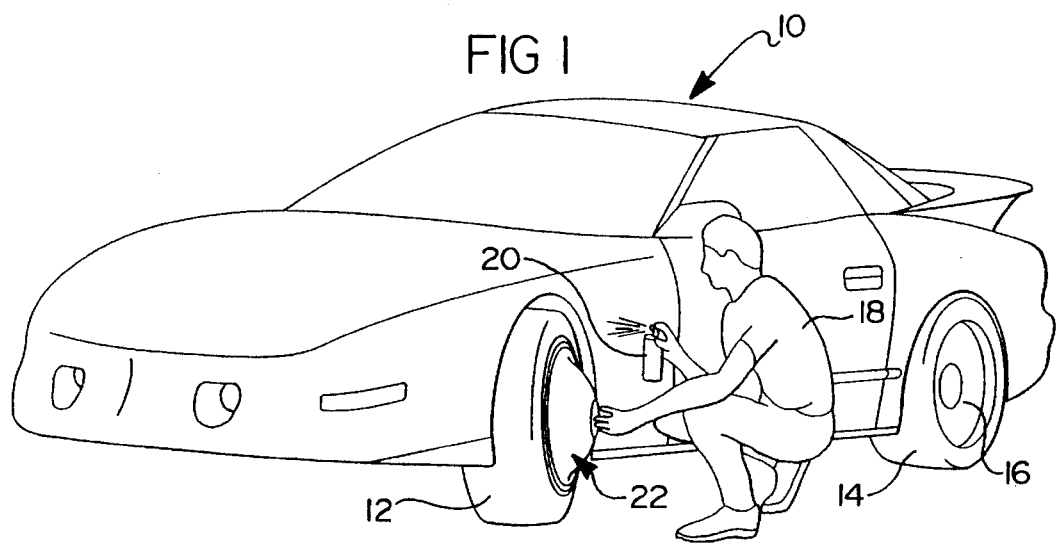
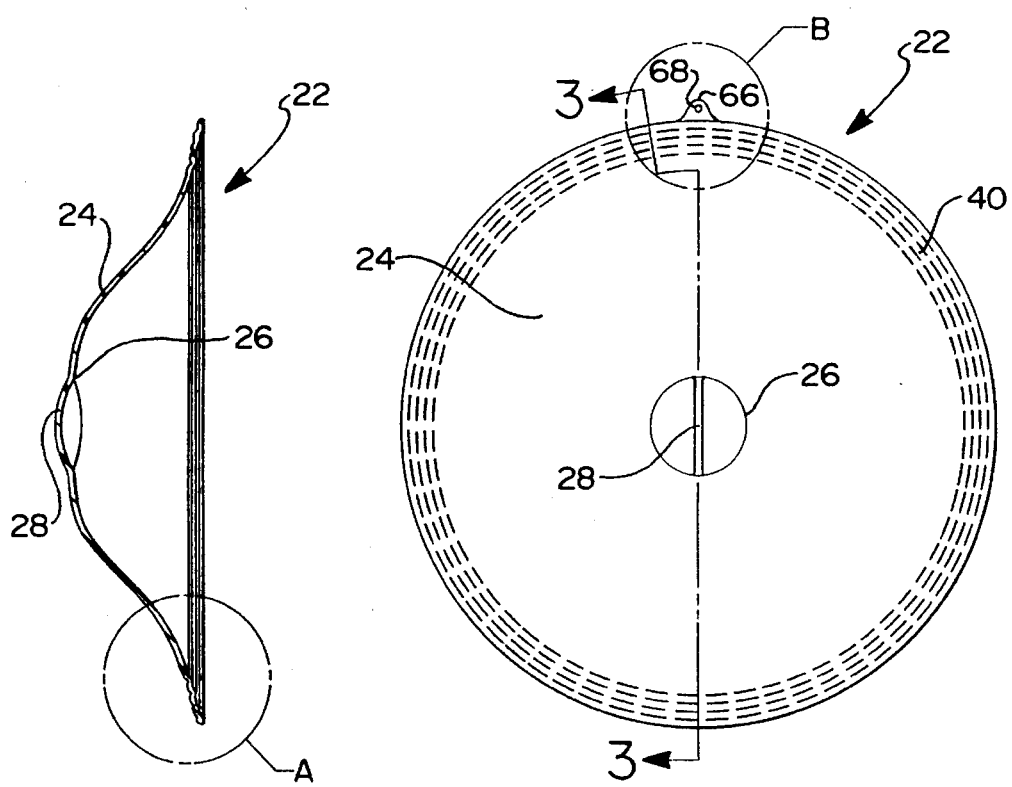

FIG 12
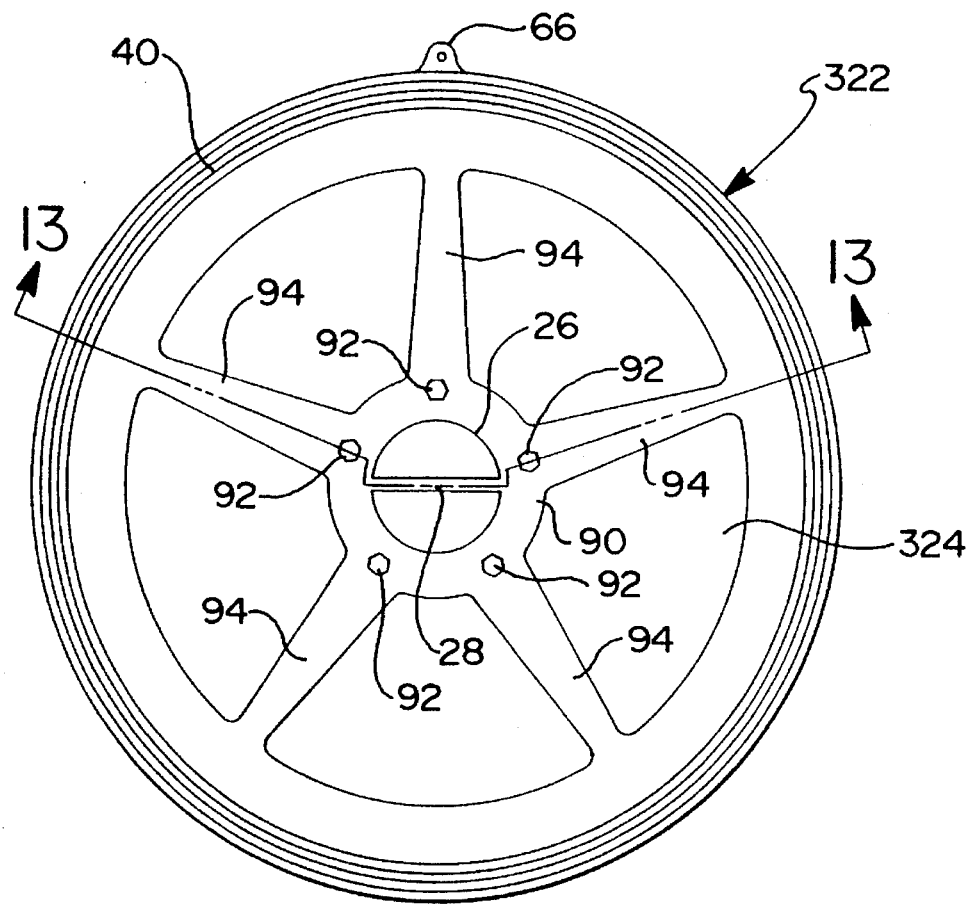
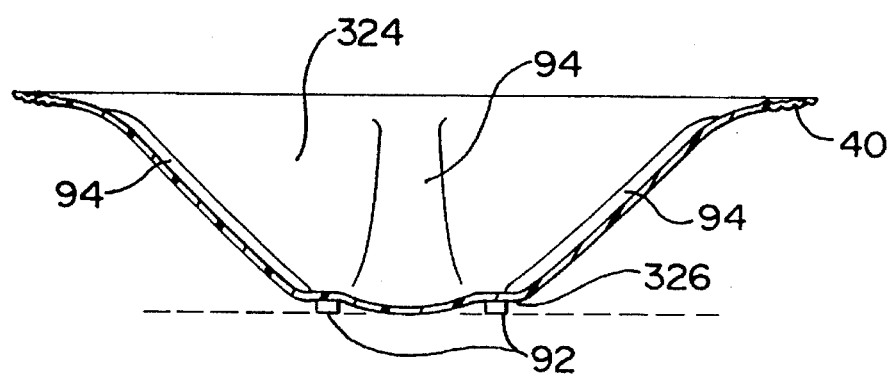
FIG 13

PROTECTIVE WHEEL MASK

BACKGROUND OF THE INVENTION

This invention relates generally to wheel protection and, more particularly, to a device for protecting a vehicle wheel when its tire is being chemically treated.

Trucks and cars, and especially new cars and trucks, represent substantial monetary investments by their owners. These vehicle owners go to great lengths to maintain the appearance of their vehicles by periodically cleaning them. Many products are available to aid the washing and waxing of these vehicles. Many other products have been developed to remove bugs, tar, tree sap and other foreign substances from the paint and bright work.

The appearance of a vehicle's wheels and tires is important to the overall vehicle appearance. Currently, most vehicles are sold with very stylish and expensive steel or aluminum wheels or with elaborate chrome wheel covers. Vehicle owners expend much effort to keep these wheels and covers bright and shiny to enhance their vehicle's appearance.

Vehicle owners like to keep their tires new looking. Many vehicles have whitewall tires, while others mount all-black tires. The white portions of these tires can become quite dirty with vehicle use, because of brake lining dust and road tar. The black portion of new tires have a deep black luster which is difficult to maintain. Merely scrubbing the tires during car washing will not restore the original whiteness or black luster.

Thus, many companies market chemical tire treatments to restore the rich black luster to vehicle tires and other chemicals to bleach the white portions. These treatments have become quite popular with car owners. These chemicals are applied by spraying them on the tires and wiping off the excess. Unfortunately, when the chemical tire treatment is sprayed on the tire, some of the chemical liquid inevitably gets on the vehicle wheel via overspray or drippage. If the chemical is not immediately and completely removed from the wheel, it can cause dulling or pitting of the wheel finish.

Devices have been developed to protect vehicle wheels during chemical tire treatment. Some of these are shown in U.S. Pat. Nos. 2,627,839; 4,784,440; 4,792,191; 4,811,991 and 4,874,206. While these devices are all directed to wheel protection, none have found commercial success. This may be due to the fact that they do not completely mask and protect a wheel or are unduly complex, do not accommodate all wheel sizes, are bulky or are not sufficiently inexpensive and easy to use.

There is a need for a device to mask and protect wheels during chemical treatment of a tire mounted on the wheel that is inexpensive, effective, easy to use, and accommodates all wheel sizes.

SUMMARY OF THE INVENTION

Accordingly, it is therefore an object of this invention to provide a device to mask and protect wheels during chemical treatment of a tire mounted on the wheel that is inexpensive, effective, easy to use, and accommodates all wheel sizes.

In one aspect, this invention features a wheel mask for use during chemical treatment of a tire comprising a circular concave body that includes a central hub having an exterior handle and includes a flared outer periphery. The handle is provided for grasping by a user's hand to position the mask over the vehicle wheel to mask the wheel during chemical treatment of the tire. The flared outer periphery comprises a plurality of radially-spaced annular raised ridges, each having tapered annular inner and outer walls connected by an annular crown. Each ridge corresponds to a specific size wheel rim, and the outer periphery terminates in an annular mask outer edge. A plurality of annular depressed grooves is formed at the juncture of adjacent inner and outer walls, and cut guidance means, preferably a plurality of spaced slits, in each groove form a plurality of radially-spaced, weakened-section annular groove cut lines. The cut lines facilitate completely severing the mask material in a selected groove to tailor the outer diameter of the mask to a specific size wheel and enable the outermost ridge to embrace the outer annular edge of a specific size wheel rim.

In another aspect, this invention features a wheel mask in which each of the slits comprise adjacent severed flaps which elastically engage each other to normally prevents passage of liquid through the slit.

In yet another aspect, this invention features a wheel mask in which the body is a unitary molding in which the handle is inwardly open and is formed of walls which project outwardly of the hub and are tapered to permit partial insertion of a handle of another mask, and the annular inner and outer walls of the ridges are angled approximately 90° relative to each other to enhance stacking of a plurality of masks.

Preferably, a hang tab extends outwardly from the outer periphery and includes a hole to provide means for hanging the wheel mask on a projection.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 is a perspective view of an automobile having a tire being sprayed by the vehicle owner with a chemical treatment, while masking the wheel from the spray by a wheel mask according to this invention;

FIG. 2 is a plan view of a wheel mask according to this invention;

FIG. 3 is a sectional view taken on line 3—3 of FIG. 2;

FIG. 12 is a plan view of still another embodiment of wheel mask according to this invention; and FIG. 13 is a sectional view taken on line 13—13 of FIG. 12.

DETAILED DESCRIPTION OF A PREFERRED EMBODIMENT

Figure 4:
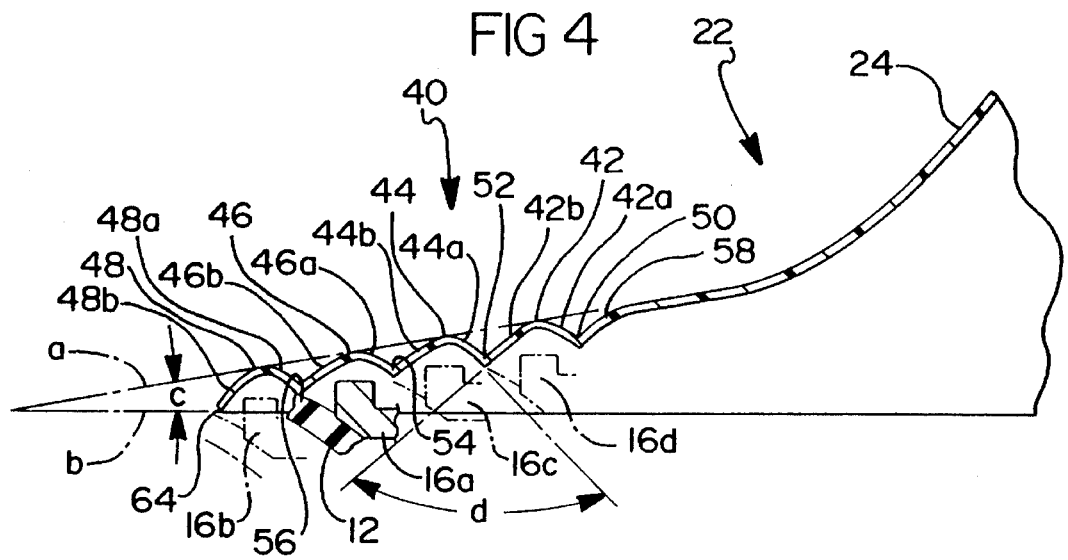
FIG. 4 is an enlarged partial sectional view illustrating a portion of FIG. 3 denoted "A"
Figure 5:
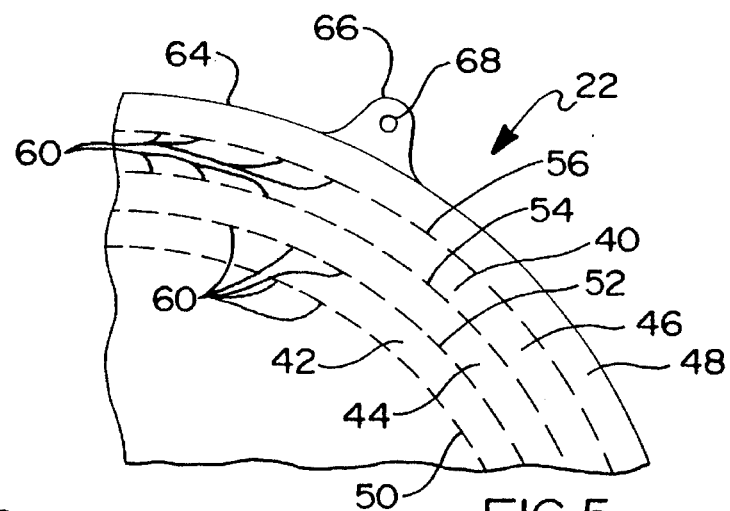
FIG. 5 is an enlarged detail view illustrating a portion of FIG. 2 denoted "B"

Referring now to FIG. 1 of the drawings, an automobile 10 includes the usual tires only two tires 12, 14 are illustrated) mounted on wheels 16 (only one visible). The vehicle owner or other user 18 is illustrated crouching and spraying tire 12 with a chemical tire treatment liquid sprayed from a container 20 held in his right hand. The wheel (not illustrated) which mounts tire 12 is shown being protected by a protective wheel mask 22 that is held in place by the other hand of owner 18.

Figure 6:
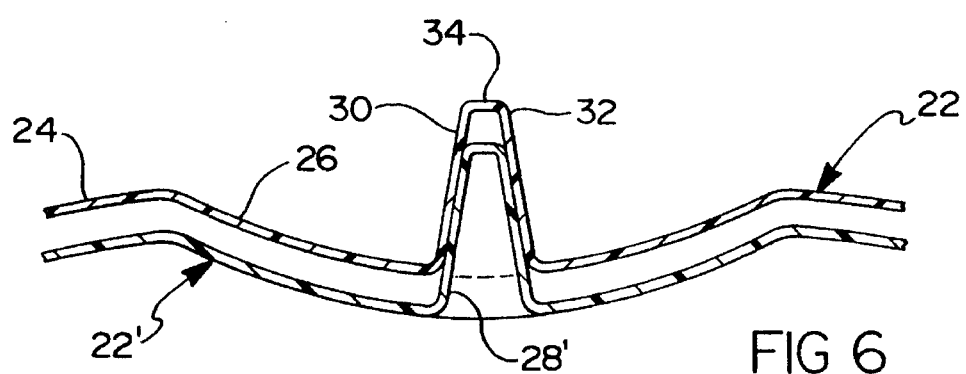
FIG. 6 is an enlarged partial sectional view illustrating the stacking of two wheel masks according to this invention.

Wheel mask 22 is a unitary piece of molded plastic, preferably made from thin polystyrene or recycled ABS plastic and having a smooth finish. As shown in FIGS. 2, 3 and 6, wheel mask 22 comprises a circular, concave or domed body 24 having a central dished hub 26 that has a hollow handle 28. Handle 28 is formed by side walls 30 and 32 that are tapered outwardly toward each other and joined at their outer ends by a handle top 34. This configuration makes handle 28 tapered and inwardly open, Handle 28 may be provided with a relatively rough surface to enhance gripping by the hand of user 18.

Mask body 24 transitions into a flared outer periphery 40 which comprises a plurality of radially-spaced, annular raised ridges 42, 44, 46, 48, as best seen in FIG. 4. These ridges comprise inner and outer annular walls 42a, 42b; 44a, 44b; 46a, 46b; 48a, 48b connected by annular crowns which form the ridges. The juncture of of adjacent ridge walls form a series of annular troughs or grooves 50, 52, 54, 56, with a wall segment 58 transitioning from flared outer periphery 40 into the domed main body 24.

Wheel mask 22 is configured for use with any specific wheel rim size, from 17" to 13". Each ridge 42–48 is radially spaced 1" from its adjacent ridge. Wheel mask 22 is easily trimmed with a pair of ordinary household shears to an exact wheel rim size. To facilitate trimming of mask 22, each groove 50–56 contains cut guidance means in the form of radially-spaced, weakened-section annular groove cut lines. These cut lines are preferably composed of a series of annularly-spaced slits 60, that are preferably ¼ inch long and are spaced at ¼ inch intervals. These grooves provide "guidelines" for cutting the wheel mask to a smaller diameter to accommodate a specific size wheel rim. To further simplify this trimming operation, the ridge walls preferably have wheel rim diameters (e.g. 13" on wall 58, 14" on wall 42b, 15" on wall 44b, 16" on wall 46b, 17" on wall 48b) molded into them. It is a simple matter for a user to simply determine the rim size by looking on the tire sidewall, locate the proper groove, cut into the groove with a pair of shears, and cut around the extent of the groove. The slits tend to "pull" the shears along to form a substantially smooth edge periphery of the proper diameter.

FIG. 4 illustrates how the various ridges fit the various size tire rim edges, denoted 16a, 16b, 16c, 16d. For example, assume that wheel mask 22 is sized by trimming along groove 56. As illustrated in solid lines, tire rim edge 16a will be embraced by walls 46a, 46b of groove 46. Note, also, that the outer periphery of wheel mask 22, which is now the outer edge of wall 46b, engages tire 12. This prevents any excess sprayed tire treatment chemical from seeping through to the vehicle wheel.

Figure 7:
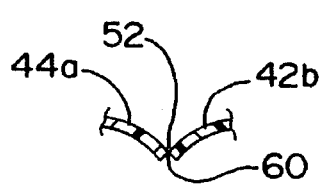
FIG. 7 is a detail view of a portion of FIG. 4.

Surprisingly, the presence of hundreds of slits 60 does not compromise the liquid barrier provided by mask 2. The slits will not transfer liquid through them when subjected to a direct pumped or aerosol spray at the pressures encountered during tire treatment spraying. The slitting process slightly stretches the adjacent wall flaps so that the inherent elasticity of the plastic material causes the flaps to spring together, as shown in FIG. 7, and prevent the passage of liquid. This assures the liquid integrity of wheel mask 22. FIG. 7 also shows how the slitting process produces a deep "V" which will guide the shears during trimming to provide a smooth trimmed periphery. The diameters of grooves 52–56 are precisely sized and spaced to assure a good fit of a wheel mask trimmed to any rim size.

As illustrated in FIG. 4, the flared outer periphery is shaped as a frustum of a cone comprising a line a connecting the crowns of raised ridges 42, 44, 46, 48 and denoted by line b and forming an angle c of 10°–20°, and preferably 15°. Adjacent wall segments are downwardly open, as shown, with adjacent wall segments being preferably angled relative to each other at an angle d of approximately 90°.

The tapered and inwardly open configuration of handle 28 enables a handle 28' of another mask 22' to be inserted into handle 28 as illustrated in FIG. 6. This enables a plurality of mask handles to be inserted within each for close stacking of a plurality of wheel masks for shipping. Stackability of the wheel mask is further enhanced by the downwardly open configuration of the raised ridges, which also assures that the outermost ridge closely embraces the edge of the wheel rim, as discussed above. The domed shape of mask body 24 further enhances stackability and enables use with wheels having extended hubs, such as wire wheels, while assuring that the outermost ridge embraces the wheel rim edge.

Another feature of this invention is that the provision of the grooves 50, 52, 54, 56 provide gutters or channels which will guide excess liquid impinging on the top of the mask to run in these channels around the periphery, rather than straight down onto the user's hand. To facilitate sales display and initial storage of mask 22, the outer periphery 64 of ridge wall 48b includes a hang tab 66 having a hole 68 to enable hanging from a hook or other protrusion. This greatly enhances the sales display of the mask 22. The use of thin gauge plastic provides light weight for ease of handling, flexibility for assuring a good fit on the wheel, and strength for durability. Since the mask 22 is an integral molded device, no assembly is required.

Figure 8:
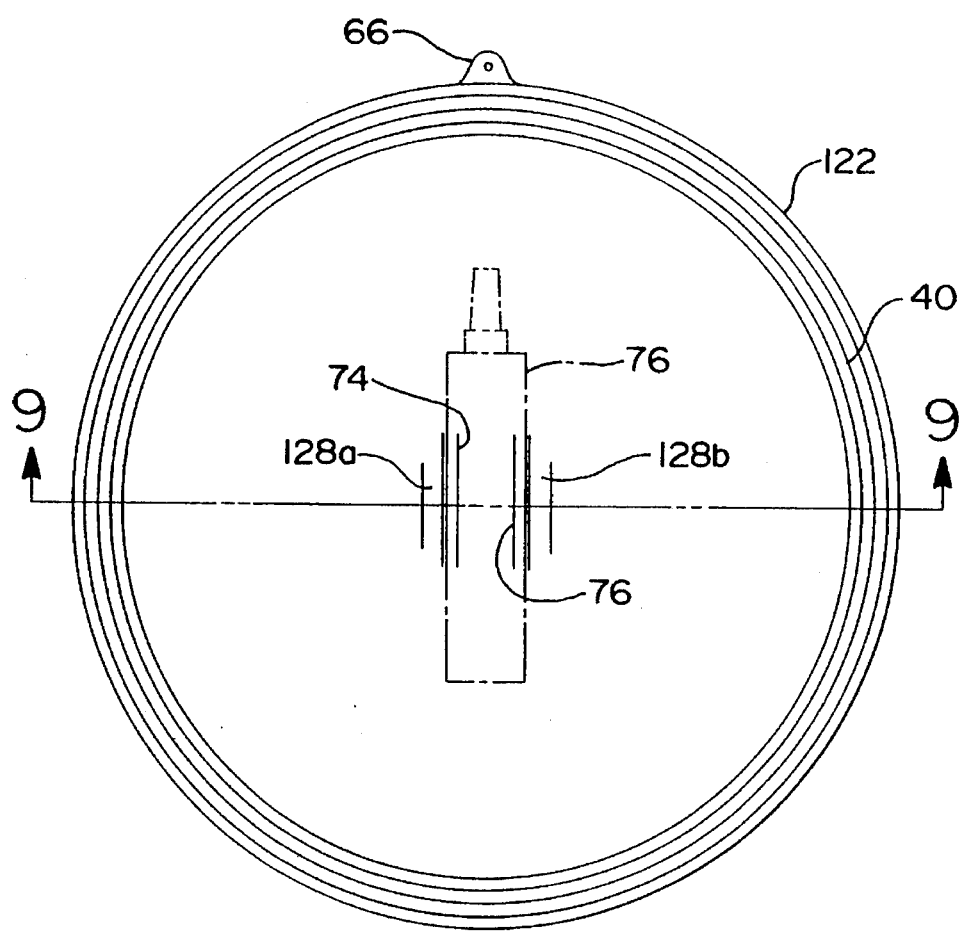
FIG. 8 is a plan view of another embodiment of wheel mask according to this invention.
Figure 9:
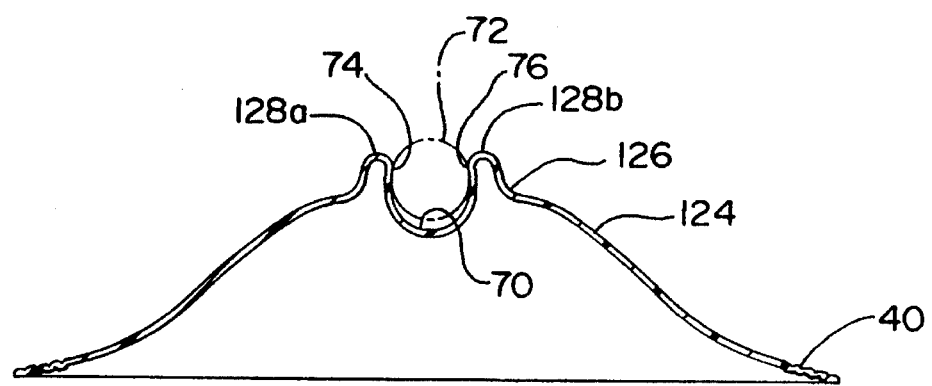
FIG. 9 is a sectional view taken on line 9—9 of FIG. 8.

Another wheel mask 122 is illustrated in FIGS. 8 and 9. This is a slight modification of mask 22, but contains the same features of stackability, trimability, light weight and wheel fit, since the ridges, grooves and cut lines are identical. Hub 126 contains a depression 70 configured to receive and retain a bottle or other container 72 of tire treatment chemical for convenience of use. Depression 70 creates a divided handle comprising two spaced portions 128a, 128b which have integral inward projecting resilient lips 74, 76 that restrict access to depression 70.

Container 72 is pushed between lips 74, 76, which spring aside to permit entry. After insertion into depression 70, container 72 is held there by lips 74, 76. Alternatively, depression 70 could be configured to retain another tire treatment appliance, such as a brusk, cloth, etc.

Figure 10:
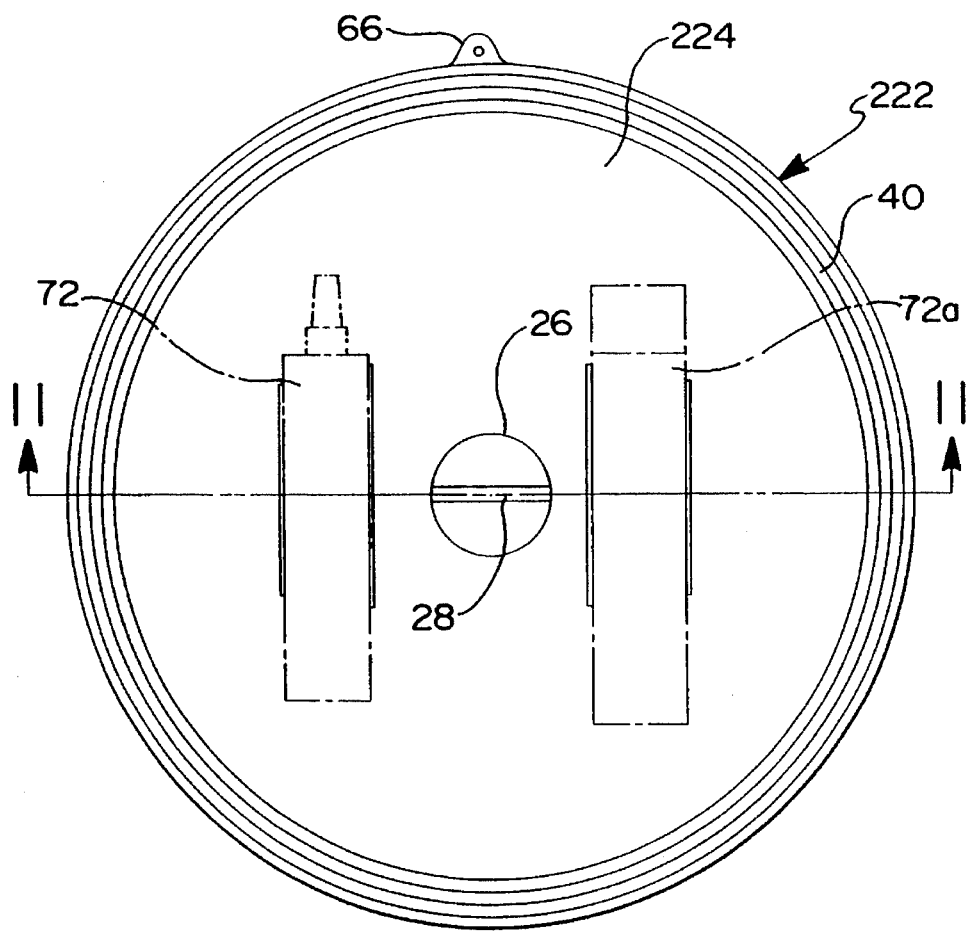
FIG. 10 is a plan view of yet another embodiment of wheel mask according to this invention.
Figure 11:
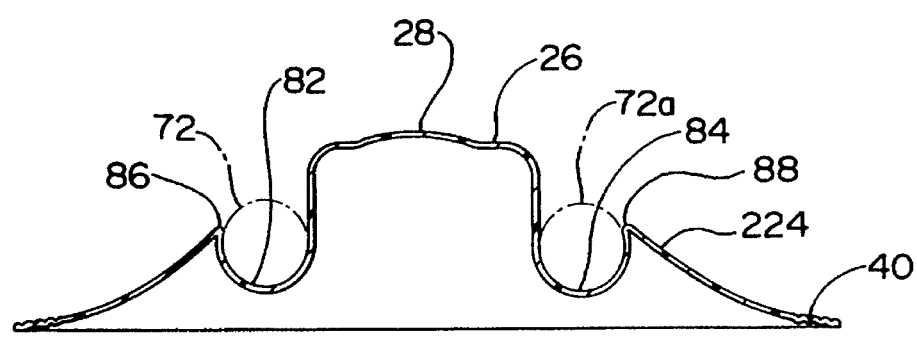
FIG. 11 is a sectional view taken on line 11—11 of FIG. 10.

FIGS. 10 and 11 illustrate another wheel mask 222 which is a modification of wheel mask 122. This is also a slight modification of mask 22, but contains the same features of stackability, trimability, light weight and wheel fit, since the ridges, grooves and cut lines are identical. Here the hub 26 and handle 28 are identical to wheel mask 22, but its body 224 contains two depressions 82 and 84 for receiving and retaining two bottles of tire treatment chemical 72, 72a or other tire treatment appliance. As with lips 74, 76 of wheel mask 122, containers 72, 72a are retained by integral resilient lips 86, 88, which restrict access and retain.

Another embodiment of wheel mask, denoted 322 is shown in FIGS. 12 and 13 and is made to resemble a wheel or wheel cover. This is again a slight modification of mask 22, but contains the same features of stackability, trimability, light weight and wheel fit, since the ridges, grooves and cut lines are identical. Five spaced projections 92, shaped like lugnuts, are spaced about hub 26. Projections 92 form a base of individual feet for maintaining wheel mask in a stable position when inverted, as shown in FIG. 13, for use as a vessel to hold liquid, such as water for wheel or spot vehicle washing. Other means for forming a base are contemplated, such as a raised ridge, but the projections 92 are illustrated because of their decorative function.

The inverted wheel mask 322 can also hold oil and act as a drip pan during oil changes. Wheel mask 322 also has five spaced integral ribs 94 shaped to resemble wheel spokes. These ribs 94 strengthen mask 322 and enable the use of thinner plastic material for the mask body.

Thus, this invention provides several embodiments of an inexpensive, strong, lightweight, flexible protective wheel mask that is easily trimmed to a particular wheel size, is liquid impervious, and is stackable, and, additionally may be provided with means to retain containers of tire treatment liquid and may be used as a liquid vessel when inverted.

While only preferred embodiments have been illustrated and described, obvious modifications thereof are contemplated within the scope of this invention and the following claims. For example, the cut guidance means could be formed of spaced indentations, instead of slits, or could be a solid annular line of weakened section. The main advantage of the cut lines is to facilitate trimming the mask to size and to provide a smooth peripheral edge.

We claim:

1. A wheel mask for use during chemical treatment of a tire that is mounted on a vehicle wheel rim having an outer annular edge, comprising a circular concave body that includes a central hub having an exterior handle and a flared outer periphery, the handle being provided for grasping by a user's hand to position the mask over the vehicle wheel to mask the wheel during chemical treatment of the tire, wherein the flared outer periphery comprises a plurality of radially-spaced annular raised ridges, each having tapered annular inner and outer walls connected by an annular crown and corresponding to a specific size wheel rim, the flared outer periphery terminates in an annular mask outer edge, a plurality of annular depressed grooves is formed at the juncture of the inner and outer walls of adjacent ridges, and cut guidance means is provided in each groove forming a plurality of radially-spaced, annular groove cut lines of weakened material section to facilitate severing the mask material in a selected groove by a cutting tool to tailor the outer diameter of the mask to a specific size wheel and enable the outermost ridge to embrace the outer annular edge of a specific size wheel rim.

2. The wheel mask of claim 1, wherein the cut guidance means comprises a plurality of spaced slits in each groove forming the plurality of annular, radially-spaced groove cut lines.

3. The wheel mask of claim 2, wherein each of said slits comprises adjacent severed flaps which elastically engage each other to normally prevents passage of liquid through the slit.

4. The wheel mask of claim 3, wherein the body is a unitary piece of molded plastic having a continuous surface imperforate except for the slits, and each of said slits comprises adjacent severed flaps which elastically engage each other to normally prevent passage of liquid through the slit, thereby masking the wheel from liquid contact during chemical treatment of the tire.

5. The wheel mask of claim 4, wherein the slits are approximately ¼" long.

6. The wheel mask of claim 1, further characterized by the body being a unitary molding in which the handle is inwardly open and is formed of walls which project outwardly of the hub and are tapered to permit partial insertion of a handle of another mask to enable stacking of a plurality of masks.

7. The wheel mask of claim 6, wherein the plurality of annular depressed grooves are configured to provide runoff channels for channeling excess liquid away from the hand of a user during chemical treatment of the tire.

8. The wheel mask of claim 7, wherein the annular inner and outer walls of the ridges are angled outwardly from the vertical to enhance stacking of a plurality of masks.

9. The wheel mask of claim 8, wherein the annular inner and outer walls of the ridges are angled approximately 90° relative to each other.

10. The wheel mask of claim 6, wherein the flared outer periphery is the frustrum of a cone in which the surface defined by the crowns of the raised ridges form an acute angle with a plane formed by the mask outer edge.

11. The wheel mask of claim 10, wherein said angle is in the range 10°–20°.

12. The wheel mask of claim 11, wherein said angle is approximately 15°.

13. The wheel mask of claim 1, wherein a hang tab extends outwardly from the outer periphery and includes a hole to provide means for hanging the wheel mask on a projection.

14. The wheel mask of claim 1, wherein a depression is formed in the concave body for holding a container of tire treatment chemical or other tire treatment device, and resilient retention means are formed integrally with the concave body for restricting passage of said container into and out of the depression.

15. The wheel mask of claim 14, wherein a second depression is formed in the concave body for holding a second wheel treatment device and resilient retention means is formed integrally with the concave body for restricting passage of said container into and out of the second depression.

16. The wheel mask of claim 1, wherein projection means extend from the concave body about the hub to form a base for maintaining the wheel mask in a stable position when inverted for use as a liquid vessel.

17. The wheel mask of claim 16, wherein a plurality of spaced radial ribs extend outwardly from the hub to rigidify the concave body.

18. A wheel mask for use during chemical treatment of a tire that is mounted on a vehicle wheel rim having an outer annular edge, comprising a circular concave body that includes a central hub having an exterior handle and terminates in a flared outer periphery, the handle being provided for grasping by a user's hand to position the mask over the vehicle wheel to mask the wheel during chemical treatment of the tire, wherein the flared outer periphery comprises a plurality of radially-spaced annular raised ridges, each having tapered annular inner and outer walls connected by an annular crown, each ridge corresponding to a specific size wheel rim, and the outer periphery terminating in an annular mask outer edge, a plurality of annular depressed grooves is formed at the juncture of inner and outer walls of adjacent ridges to form a weakened section to provide cut guidance means to facilitate severing the mask material in a selected groove by a cutting tool to tailor the outer diameter of the mask to a specific size wheel and enable the outermost ridge to embrace the outer annular edge of a specific size wheel rim, the body is a unitary plastic molding which masks the wheel from liquid contact during chemical treatment of the tire, and is formed with the handle inwardly open and having walls which project outwardly of the hub and are tapered to permit partial insertion of a handle of another mask, and with the annular inner and outer walls of the ridges angled outwardly from the vertical to enhance stacking of a plurality of masks.

19. The wheel mask of claim 18, wherein the flared outer periphery is the frustrum of a cone in which the surface defined by the bottoms of the grooves form an acute angle of 10°–20° with a plane formed by the mask outer edge.

* * * * *